United States Patent [19]
Gassner et al.

[11] Patent Number: 5,571,961
[45] Date of Patent: Nov. 5, 1996

[54] WHEEL-LOAD SENSOR WITH PIEZO-ELECTRIC PICKUP AND METHOD OF MANUFACTURING SUCH A SENSOR

[75] Inventors: Siegfried Gassner, Ohope, New Zealand; Joe Cal, Chambersburg, Pa.

[73] Assignee: Pietzsch AG, Ettlingen, Germany

[21] Appl. No.: 316,579

[22] Filed: Sep. 30, 1994

[30] Foreign Application Priority Data

Oct. 1, 1993 [DE] Germany .......................... 43 33 532.2

[51] Int. Cl.$^6$ ....................................................... G01M 5/00
[52] U.S. Cl. ................................................. 73/146; 73/786
[58] Field of Search ............................ 73/146, 805, 786, 73/818

[56] References Cited

U.S. PATENT DOCUMENTS

| | | | |
|---|---|---|---|
| 4,712,423 | 12/1987 | Siffert et al. | 73/146 |
| 4,799,381 | 1/1989 | Tromp | 73/146 |
| 4,958,306 | 9/1990 | Powell et al. | 73/146 |
| 5,056,354 | 10/1991 | Kuwana et al. | 73/146 |
| 5,448,232 | 9/1995 | Tyburski | 340/933 |
| 5,463,385 | 10/1995 | Tyburski | 340/93 |

*Primary Examiner*—Richard Chilcot
*Assistant Examiner*—Max H. Noori
*Attorney, Agent, or Firm*—Max Fogiel

[57] ABSTRACT

A wheel-load sensor cast into a mass of material for positioning in a depression in a pavement or the like. The sensor includes a piezo-electric pickup. The pickup encloses an inner electrode and is enclosed in at least one outer electrode. The inner electrode is a solid conductor and the outer electrode a hollow conductor. The pickup can be positioned in the pavement. Some sections (16) of the wall of the piezo-electric pickup (11) more or less parallel the surface of the road. These sections are accommodated subject to a prescribed pressure between the adjacent sections of the wall of the hollow conductor (13') that constitutes the outer electrode and the other sections (16') of the wall of the piezo-electric pickup in the hollow conductor and away from the rest of the walls.

11 Claims, 1 Drawing Sheet

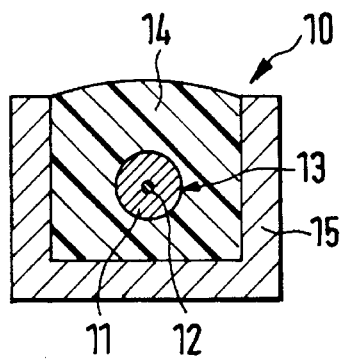
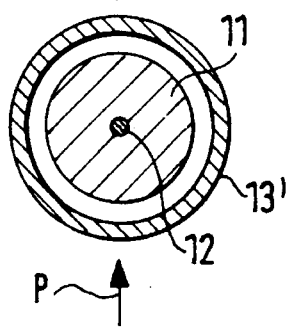
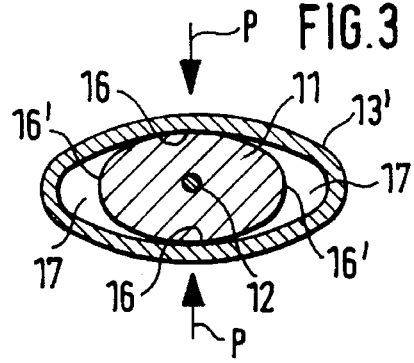
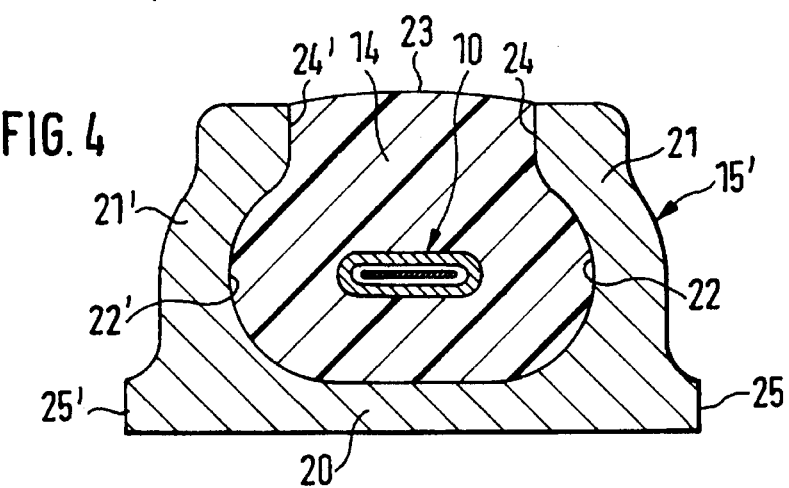
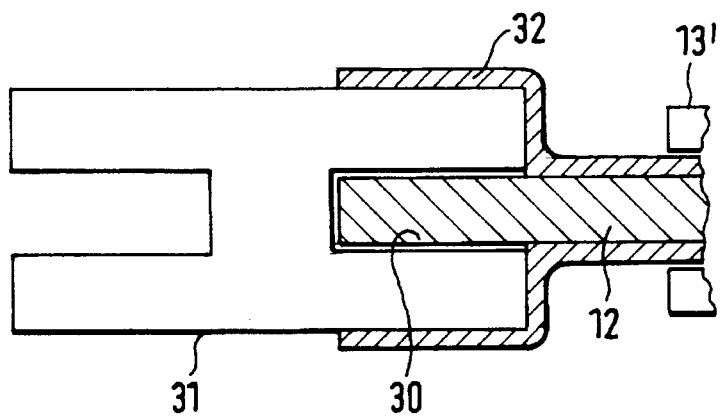

WHEEL-LOAD SENSOR WITH PIEZO-ELECTRIC PICKUP AND METHOD OF MANUFACTURING SUCH A SENSOR

BACKGROUND OF THE INVENTION

The present invention concerns a wheel-load sensor cast into a mass of material for positioning in a depression in a pavement or the like. The sensor includes a piezo-electric pickup. The pickup encloses an inner electrode and is enclosed in at least one outer electrode. The inner electrode is a solid conductor and the outer electrode a hollow conductor. The pickup is positioned in the pavement. The invention also concerns a method of manufacturing such a wheel-load sensor.

Wheel-load sensors of this type and methods of manufacturing them are known. The pickups are usually lengths of piezo-electric cable or strips of piezo-electric tape. The cable or tape encloses a solid conductor and is enclosed in a hollow conductor. The overall sensor is cast into a mass of material accommodated in a length of structural section open along one side.

Such sensors have drawbacks. When they are installed in the pavement and a vehicle drives over them it is impossible to prevent contamination of the results by undesirable horizontal load components. These components derive from the wheels of the test subject generating a forward horizontal thrust that extensively depends of the state of the road surface. The objects of the present invention are accordingly a wheel-load sensor and a method of manufacturing it that will minimize the contaminating horizontal components and ensure that the piezo-electric pickup's electronic output represents only the vertical components of the particular wheel load.

SUMMARY OF THE INVENTION

The first object is attained in accordance with the present invention in the wheel-load sensor has some sections of the wall of the piezo-electric pickup more or less parallel to the surface of the road and accommodated subject to a prescribed pressure between the adjacent sections of the wall of the hollow conductor that constitutes the outer electrode and the other sections of the wall of the piezo-electric pickup in the hollow conductor and away from the rest of the walls.

The piezo-electric pickup can be a round cable flattened along with the hollow conductor. It can just as well be an originally ribbon-shaped cable tensioned between the adjacent wall sections of the flattened hollow conductor. Such a structure will render the wheel-load sensor particularly sensitive and allow it to be installed below the surface of the road.

In state-of-the-art sensors the entire hollow conductor rests against the outer surface of the piezo-electric pickup and accordingly detects undesirable horizontal components from its contact with the pavement that accommodates the incoming pressure waves. In the sensor in accordance with the present invention on the other hand only those sections of the wall of the piezo-electric pickup are impacted by the hollow conductor that when the device is in position rest along their vertical axis against it subject to a prescribed pressure. Spaces are left between the remaining sections of the outer surface of the piezo-electric pickup and the sections of the inner surface of the hollow conductor that face them. The spaces, which extend along each side of the piezo-electric pickup when the device is in position, prevent the pavement from transmitting horizontal components of the pressure waves to the pickup.

The hollow conductor in one practical embodiment of the invention extends farther perpendicular to the direction the piezo-electric pickup is tensioned in than along it. The hollow conductor is accordingly anisotropic in cross-section.

The cross-section of the hollow conductor that encloses the piezo-electric pickup in one particularly advantageous embodiment of the invention is more or less elliptical with its longest diameter at an angle to the direction of tension. The spaces are accordingly positioned at each end of the longest diameter inside the ellipse.

It will be practical for the wall sections of the piezo-electric pickup that rest subject to pressure against the hollow conductor to lie in more or less parallel planes. Any pressure waves or pulses that do not arrive strictly perpendicular to these wall sections will accordingly be suppressed.

The piezo-electric pickup in another advanced version of the invention is accommodated in a length of structural section that is open at the top and extends across the road when the device is in position. The length of structural section can comprise a base and two flanges and a C-shaped interior, with the edges of the opening having undercuts. The section accommodates the material that the sensor is cast into. The C shape prevents the sensor from undesirably shifting inside the length of structural section.

The edges of the base of the length of structural section can extend beyond the flanges to create a sole. This design helps to secure the sensor stationery in the pavement. It will be practical in this event for the length of structural section to be positioned in a groove that extends across the road and to be embedded in the same type of material that the piezo-electric pickup is cast into.

Such a wheel-load sensor can have an adaptor to keep moisture out of between the inner electrode and the piezo-electric pickup that encloses it, whereby the end of the inner electrode that projects beyond the hollow conductor is accommodated in a slot in the adaptor and the area around the slot is sealed tight against the pickup. The adaptor can be a metal H with the slot that accommodates the end of the inner electrode extending from one face and sealed off at the slot by one end of a surface that constitutes the piezo-electric pickup.

Such an adaptor at one end of the wheel-load sensor will effectively prevent moisture from penetrating between the piezo-electric pickup and the inner electrode. The otherwise possible accumulation between the pickup and the electrode would contaminate the results.

The second object of the present invention, which concerns manufacturing such a wheel-load sensor, is attained in that the piezo-electric pickup is inserted with the inner electrode inside it into an oversized hollow conductor that is then flattened until oppositely facing wall sections of the pickup are compressed between the flattened walls of the hollow conductor, leaving spaces between the uninvolved outer surfaces of the pickup and the facing walls of the hollow conductor, and in that the hollow conductor is cast into the mass of material with the pickup inside it with its tensioned wall sections essentially paralleling the surface of the road when the device is in position.

The method in accordance with the present invention accordingly differs from the state of the art in the tensioning of the piezo-electric pickup between the flattened sections of the wall of the hollow conductor, whereby the two separate spaces between the pickup and the hollow conductor dictate a measurement axis. Their location in the material allows practically only one component of a pressure wave or pulse to be detected.

One particularly simple embodiment of the method in accordance with the invention is characterized by flattening a round hollow conductor until its cross-section becomes elliptical.

BRIEF DESCRIPTION OF THE DRAWINGS

One embodiment of the present invention will now be specified with reference to the accompanying drawing, wherein FIG. 1 is a transverse section through a wheel-load sensor at the state of the art with a piezo-electric pickup cast into a mass of material inside a length of structural section, FIG. 2 is a transverse section through a piezo-electric pickup in a round hollow conductor, FIG. 3 is a transverse section similar to that in FIG. 2 illustrating the assembly of piezo-electric pickup and hollow conductor during the second stage of manufacture, once the conductor has been flattened, with the piezo-electric pickup tensioned between oppositely facing deformed sections of the wall of the hollow conductor, FIG. 4 is a transverse section similar to that in FIG. 1 of a wheel-load sensor manufactured in accordance with the present invention, whereby the piezo-electric pickup is cast into a mass of material in a length of structural section with a C-shaped interior, and FIG. 5 is a longitudinal section through an adaptor secured tight to the end of the piezo-electric pickup.

DESCRIPTION OF THE PREFERRED EMBODIMENTS

The sensor 10 illustrated in FIG. 1 is employed to detect wheel loads in moving traffic. Sensor 10 is accordingly positioned at a right angle to the road in the pavement of one lane and more or less flush with its surface. Piezo-electric pickups, generally semicrystalline polymer cables, are employed as pressure sensors.

As will be evident from FIG. 1, wheel-load sensor 10 includes a piezo-electric pickup 11 in the form of a cable enclosing a coaxial solid conductor 12 that acts as an inner electrode. Piezo-electric pickup 11 is itself enclosed in a hollow metal conductor 13. The resulting capacitor is centrally accommodated in a length 15 of U section. Length 15 is completely occupied by a mass 14 of material, conventionally epoxy resin. The material transmits the waves of pressure emitted by the vehicles being tested. Wheel-load sensor 10 is employed positioned in a depression in the pavement with length 15 extending across the lane at a right angle and with its open side toward the surface of the road.

When the device is in position, piezo-electric pickup 11 will respond to incoming pressure waves or pulses by polarizing its charge carrier and will emit electric signals proportional to the momentary pressure it is subjected to. Undesirable horizontal components will, however, inevitably accompany the desired vertical components of the pressure waves and will contaminate the results in the illustrated state-of-the-art system.

The somewhat different wheel-load sensor 10 in accordance with the present invention will now be specified with reference to FIG. 2.

Piezo-electric pickup 11 is inserted in a larger cross-section rigid hollow conductor 13'. Both pickup 11 and conductor 13' can initially have a round cross-section. Conductor 13' is now flattened along an axis P perpendicular to its central longitudinal axis until its cross-section is approximately elliptical and the outer wall surfaces 16 of piezo-electric pickup 11 oriented along axis P are tensioned between the sections of its wall that face away from each other subject to pressure. The wall sections 16' of piezo-electric pickup 11 that are not subject to pressure are accordingly somewhat distanced from the inner surfaces of hollow conductor 13' that face them, leaving a space 17 in the cross-section of wheel-load sensor 10 perpendicular to axis P on each side of piezo-electric pickup 11.

When the device is in position, hollow conductor 13' is embedded in mass 14 of material, which transmits the incoming waves of pressure. The vertical components of these waves impinge against the wall sections 6 of the piezo-electric pickup tensioned between the hollow conductor, whereas the horizontal components are eliminated. Although the curved outer surfaces of hollow conductor 13' that demarcate each space 17 can indeed still pick up pressure-wave components that deviate from the vertical, and horizontal components in particular, they cannot transmit them directly to piezo-electric pickup 11 because the wall sections of hollow conductor 13' are, as will be evident from FIG. 3, not in contact with remaining wall sections 16'.

That the wall sections 16 of piezo-electric pickup 11 that rest subject to pressure against hollow conductor 13' can face each other and extend more or less parallel establishes an axis of measurement oriented along axis P of pressure. When the sensor illustrated in FIG. 3 is appropriately cast into mass 14 of material in length 15 of section with pressure or measurement axis P perpendicular to the surface of the pavement, practically only the vertical components of the pressure waves emitted by the subject will be picked up. Practically none of the components that deviate from the vertical will be transmitted by this system to piezo-electric pickup 11.

The sensor in the embodiment illustrated in FIG. 4 is accommodated in a length 15' of section with a C-shaped interior and a base 20 and two flanges 21 and 21'. The edges of the opening have undercuts 22 and 22'. When the device is in position, the open side of the length faces the pavement. The interior of such a length of section secures the sensor within the mass of material and accordingly within the length. The approach ensures that the measurement axis of the sensor 10 accommodated in mass 14 of material will be precisely aligned within the length of section. The edges 25 and 25' of base 20 can extend to each side of flanges 21 and 21' to create a sole. This feature securely anchors the device in the pavement when it is installed in the lane.

FIG. 5 illustrates an embodiment of the wheel-load sensor in accordance with the present invention whereby one end of solid conductor 12 extends beyond hollow conductor 13' and is accommodated in a depression 30 in the face of a longitudinally H-shaped adapter 31 and one terminal section 32 of a tubular piezo-electric pickup 11 surrounds and seals off the adapter.

We claim:

1. A wheel-load sensor cast into a mass of material for positioning in a depression in a pavement, comprising: a sensor having a piezo-electric pickup enclosing an inner electrode; an outer electrode enclosing said pickup; said inner electrode being a solid conductor and said outer electrode being a hollow conductor, said pickup being positionable in the pavement; said piezo-electric pickup having wall sections substantially parallel to the pavement surface and received subject to a predetermined pressure between adjacent sections of the hollow conductor wall comprising said outer electrode and other sections of the piezo-electric pickup wall in the hollow conductor and away from the remainder of the walls, a hollow space being left between said pickup and said outer conductor along said adjacent sections of said hollow conductor and said other sections of said pickup wall for keeping said sections separated said adjacent sections of said hollow conductor and said other sections of said pickup being non-parallel to the pavement; said sensor having an output free of influence from horizontal components of a force acting on said sensor, said output being influenced only by components of said force that act perpendicular to said sensor and against said parallel wall sections.

2. A wheel-load sensor as defined in claim 1, wherein said piezo-electric pickup is tensioned in a direction, said hollow conductor extending farther perpendicular to said direction said piezo-electric pickup is tensioned in than along it.

3. A wheel-load sensor as defined in claim 1, wherein said hollow conductor enclosing said piezo-electric pickup has a substantially elliptical cross-section.

4. A wheel-load sensor as defined in claim 1, wherein said wall sections of said piezo-electric pickup rest subject to pressure against said hollow conductor and lie in substantially parallel planes.

5. A wheel-load sensor as defined in claim 1, wherein said piezo-electric pickup is received in a length of structural section having an open top and extending across the pavement.

6. A wheel-load sensor as defined in claim 5, wherein said length of structural section comprises a base and two flanges and a C-shaped interior, said structural section having an opening with edges having undercuts.

7. A wheel-load sensor as defined in claim 6, wherein said base has edges corresponding to said length of said structural section and extending beyond the flanges to form a sole.

8. A wheel-load sensor cast into a mass of material for positioning in a depression in a pavement, comprising: a sensor having a piezo-electric pickup enclosing an inner electrode; an outer electrode enclosing said pickup; said inner electrode being a solid conductor and said outer electrode being a hollow conductor, said pickup being positionable in the pavement; said piezo-electric pickup having wall sections substantially parallel to the pavement surface and received subject to a predetermined pressure between adjacent sections of the hollow conductor wall comprising said outer electrode and other sections of the piezo-electric pickup wall in the hollow conductor and away from the remainder of the walls, a hollow space being left between said pickup and said outer conductor along said adjacent sections of said hollow conductor and said other sections of said pickup wall for keeping said sections separated said adjacent sections of said hollow conductor and said other sections of said pickup being non-parallel to the pavement; said sensor having an output free of influence from horizontal components of a force acting on said sensor, said output being influenced only by components of said force that act perpendicular to said sensor and against said parallel wall sections; an adaptor for keeping moisture out of between said inner electrode and said piezo-electric pickup enclosing said inner electrode, an end of said inner electrode projecting beyond said hollow conductor and being accommodated in a slot in said adaptor, said slot having a surrounding area sealed tight against the pickup.

9. A wheel-load unit as defined in claim 8, wherein said adaptor comprises a metal H, said slot accommodating said inner electrode extending from one face and sealed off at said slot by one end of a surface comprising said piezo-electric pickup.

10. A method for producing a wheel-load sensor cast into a mass of material for positioning in a depression in a pavement, comprising the steps of: providing a piezo-electric pickup having inside an inner electrode; inserting said piezo-electric pickup with said inner electrode into a hollow conductor having an interior larger than said pickup; flattening said hollow conductor until oppositely facing wall sections of said pickup are compressed between flattened walls of said hollow conductor, said pickup having outer surfaces free from contact with said hollow conductor; leaving spaces between said outer surfaces of said pickup and facing walls of said hollow conductor; casting said hollow conductor into a mass of material with said pickup inside said hollow conductor and said oppositely facing wall sections of said pickup are substantially parallel to the surface of the pavement when said sensor is installed in position; said spaces keeping separated said outer surfaces of said pickup and said facing walls of said hollow conductor, said sensor having an output free of influence from horizontal components of a force acting on said sensor, said output being influenced only by components of said force that act perpendicular to said sensor and against said oppositely facing wall sections of said pickup that are substantially parallel to the surface of the pavement when said sensor is installed in position.

11. A method as defined in claim 10, wherein said hollow conductor has a circular cross-section before flattening said hollow conductor; and flattening said hollow conductor until it has an elliptical cross-section.

* * * * *